US010412161B2

(12) United States Patent
Botarelli et al.

(10) Patent No.: US 10,412,161 B2
(45) Date of Patent: Sep. 10, 2019

(54) METHOD AND SYSTEM FOR COHERENT AGGREGATION AND SYNCHRONIZATION OF GATHERED DATA FROM SPREAD DEVICES

(71) Applicant: ABB Technology AG, Zurich (CH)

(72) Inventors: Andrea Botarelli, Terranuova Bracciolini (IT); Davide Tazzari, Loro Ciuffenna (IT); Filippo Ceccherini, Terranuova Bracciolini (IT); Filippo Vernia, La Spezia (IT); Tito Cuccoli, Terranuova Bracciolini (IT)

(73) Assignee: ABB Schweiz AG, Baden (CH)

( * ) Notice: Subject to any disclaimer, the term of this patent is extended or adjusted under 35 U.S.C. 154(b) by 465 days.

(21) Appl. No.: 15/082,594

(22) Filed: Mar. 28, 2016

(65) Prior Publication Data

US 2016/0292046 A1 Oct. 6, 2016

(30) Foreign Application Priority Data

Mar. 31, 2015 (EP) .................................... 15161807

(51) Int. Cl.
| | |
|---|---|
| G06F 16/00 | (2019.01) |
| H04L 29/08 | (2006.01) |
| H04Q 9/04 | (2006.01) |
| G06F 17/40 | (2006.01) |

(52) U.S. Cl.
CPC .......... *H04L 67/1095* (2013.01); *G06F 17/40* (2013.01); *H04L 67/125* (2013.01);
(Continued)

(58) Field of Classification Search
CPC .. G06F 11/1464; G06F 11/1455; G06F 16/00; G06F 17/30; G06F 17/40;
(Continued)

(56) References Cited

U.S. PATENT DOCUMENTS

| | | | |
|---|---|---|---|
| 8,649,336 B2 * | 2/2014 | Tazzari | ............... H04L 29/1232 370/329 |
| 2002/0155808 A1 * | 10/2002 | Kawamura | ............ G08C 17/00 455/3.05 |

(Continued)

FOREIGN PATENT DOCUMENTS

| | | |
|---|---|---|
| GB | 2290623 A | 3/1996 |
| JP | 2010175413 A | 8/2010 |
| WO | 200201605 A2 | 1/2002 |

*Primary Examiner* — Anh Ly
(74) *Attorney, Agent, or Firm* — Patterson Intellectual Property Law, P.C.; Gary L. Montle

(57) ABSTRACT

In a method for gathering time-variable data from electronic slave devices in data communication through a data transmission channel with an electronic master device, the slave devices periodically measure and store a current value of at least one respective time-variable parameter (P1(t), . . . Pn(t)). The master device sends a freeze command to the slave devices. Upon receipt of the freeze command from the master device, the slave devices freeze the last measured value of the at least one time-variable parameter. During a data-gathering time interval following sending of the freeze command, the master device gathers the frozen values from the slave devices.

22 Claims, 5 Drawing Sheets

(52) U.S. Cl.
CPC ......... *H04Q 9/04* (2013.01); *H04Q 2209/753* (2013.01); *Y04S 40/18* (2018.05)

(58) Field of Classification Search
CPC ..... G06F 3/00; H04L 67/1095; H04L 67/125; H04L 29/1232; H04Q 2209/753; Y04S 40/18
USPC ........................................................ 707/623
See application file for complete search history.

(56) References Cited

U.S. PATENT DOCUMENTS

| | | | | |
|---|---|---|---|---|
| 2005/0086273 | A1* | 4/2005 | Loebbert | H04W 84/20 707/999.204 |
| 2009/0300304 | A1* | 12/2009 | Boyd | G06F 11/2064 711/162 |
| 2011/0040859 | A1* | 2/2011 | Tazzari | H04L 29/1232 709/222 |
| 2012/0072628 | A1* | 3/2012 | Crockett | G06F 13/4291 710/110 |
| 2012/0323346 | A1* | 12/2012 | Ashby | A63B 21/005 700/91 |
| 2013/0013632 | A1* | 1/2013 | Steinle | G06F 9/5011 707/769 |
| 2014/0036734 | A1* | 2/2014 | Fong | G06F 13/4286 370/276 |
| 2014/0368040 | A1 | 12/2014 | Chen et al. | |
| 2015/0074312 | A1* | 3/2015 | Barus | G06F 13/4027 710/306 |
| 2016/0112507 | A1* | 4/2016 | Serpico | H04L 67/06 709/205 |

* cited by examiner

METHOD AND SYSTEM FOR COHERENT AGGREGATION AND SYNCHRONIZATION OF GATHERED DATA FROM SPREAD DEVICES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation of and claims benefit of European Patent Application No. 15161807.1 filed Mar. 31, 2015, entitled "Method and System for Coherent Aggregation and Synchronization of Gathered Data from Spread Devices", the entirety of which is incorporated herein by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention concerns systems and methods for gathering data and information from a plurality of distributed devices and correctly aggregating the collected or gathered data in a time-consistent manner.

Many electronic systems comprise a plurality of spread devices, i.e. devices which can be distributed over an extensive area, and wherefrom data concerning operation thereof must be collected and aggregated in a time-consistent manner, e.g. for monitoring purposes.

Examples of such systems comprise, but are not limited to renewable energy power generation plants, such as photovoltaic installations, wind farms and the like. Further examples of such systems are for instance rectifier networks for telecommunication. The spread devices can typically be electric converters, such as rectifiers, inverters and the like.

A serial line, e.g. an RS485 serial line, or another low-speed communication or transmission channel is often used to connect the spread electronic devices to a master device, which monitors the system. A low-speed transmission channel is usually chosen in these applications in view of the long distances which must be covered, sometimes spanning over several kilometers. A master-slave approach is usually adopted for transmitting data from the spread devices (slave devices or slave units) to a control unit or master device, acting as a data logger controller. This latter collects the measured values of one or more parameters from each slave device and relating to the operation of the slave devices or apparatus connected thereto. Measured parameters of interest can include, but are not limited to, power, energy, voltage, temperature of device components, and the like. These parameters are usually time-variable parameters, i.e. they vary during time.

The data transmission protocol between data logger controller, i.e. master device, and slave devices can sometimes be very simple, such that the measured value of not more than a single parameter can be transmitted at a time. As such, if e.g. 50 different parameter values shall be gathered from the slave devices, the master device shall send a total of fifty data polling commands per each single slave device. If there is a total of 64 such devices, and each transaction, i.e. polling command from the master device and answer from the slave device to the master device requires 200 ms, the total time required for completing the data gathering is 10.6 minutes. The collected data are not time-consistent and synchronous, and a delay up to 10.6 minutes exists between the first to the last value collected by the master device.

Methods also exist, wherein a single message is configured to transmit several parameters together, but sometime this is still not enough, because of the large amount of measurement data that require to be transferred. Several messages are still required to transfer a complete set of measurements. Additionally the gathered data from the various devices will be non-synchronous.

Assuming for instance that the slave devices are micro-inverters connecting a plurality of photovoltaic panels or wind-power generators to an electric power distribution grid, and assuming that information is required from the master unit on the total instant power generated by the entire set of micro-inverters, a standard system which uses a low-speed transmission channel as described above would not be able to determine the instant power generated at a given point in time, since what is actually gathered by the master device is the sum of data sampled at different time instants, spread over more than ten minutes.

In order to synchronize measurements of parameters, some known systems utilize to time stamps to tag the measurements, performed at different instants in time. This approach requires the monitoring system to provide a reference clock in order to synchronize the various slave devices. Other approaches provide for speeding-up the polling period, in order to reduce the poll time down to seconds, using a fast connection between the slave devices and the master device. Both systems are costly and complex and moreover are not back-compatible i.e. cannot be implemented in already existing installations.

A need therefore exists for a system and method of gathering data relating to time-variable parameters from a plurality of devices connected to a master or data logger controller, which is simple and enables gathering time-consistent, synchronized data.

BRIEF SUMMARY OF THE INVENTION

According to a first aspect, a method is provided of gathering time-variable data from electronic slave devices in data communication through a data transmission channel with an electronic master device, wherein the slave devices periodically measure and store a current value of at least one respective time-variable parameter. According to embodiments disclosed herein, the master device sends a freeze command to the slave devices. Upon receipt of the freeze command from the master device, the slave devices freeze the last measured value of the at least one time-variable parameter. During a data-gathering time interval following sending of the freeze command, the master device gathers the frozen values from the slave devices.

An electronic master device, as understood herein, can be any electronic device which can operate as a data gathering unit, collecting values of measured parameters from a plurality of electronic slave devices. An electronic slave device as understood herein can be any device, which provides sampled and stored values of at least one time-variable parameter, which are required to be gathered by the master device. A time-variable parameter, as understood herein, is any parameter, the value whereof shall be gathered by the master device, and which can vary during time. Exemplary time-variable parameters can be for instance the voltage across the input or output terminals of an inverter or a rectifier, the input current or the output current of an inverter or rectifier, the temperature of an electronic component.

A freeze command is a command from the master device, which can be coded according to any suitable communication protocol, the function whereof is to freeze the value measured by the slave device, such that the measured device is maintained unaltered (i.e. "frozen") for a certain period of time, e.g. until a time interval has lapsed or until a further event occurs, such as the gathering of the frozen value by the master device.

According to embodiments disclosed herein the freeze command is a so-called broadcast command. As understood herein, broadcast command is a command that is transmitted to a plurality of addresses, rather than being addressed to a specific addressee. Herein after the freeze command will be usually referred to as a broadcast freeze command.

A broadcast command is usually sent from the master device to all slave devices of a system, and is received by all slave devices at substantially the same time, neglecting the difference in time determined e.g. by different distances between the master device and the various slave devices, or other spurious factors which may have an influence on the time required by the broadcast command to reach the various slave devices.

The transmission channel between the master device and the slave devices can be any data transmission channel suitable to support transmission of the data, commands, messages and the like, as disclosed herein. The transmission channel can be a wired transmission channel, e.g. a low-speed transmission channel as defined above, or a wireless transmission channel.

According to some embodiments, the slave devices are electric power converters, e.g. inverters, connected to electric generators, preferably electric generators converting a power from a renewable energy source into electric power, e.g. photovoltaic panels, wind turbines and the like.

By the above method, all the slave devices receive the freeze command at substantially the same instant in time. Consequently, the value of the parameter which is frozen by the various slave devices is the most updated value available at the same instant in time. Suppose that the parameter is sampled and measured periodically, with a period (time between subsequent measures) Tp, the maximum time shift between measured values of two devices is Tp. This time interval can be made as small as required, such that the various measured values from the different slave devices can be considered substantially synchronous, i.e. taken at the same instant in time. The sampling period can be different for different devices and/or for different parameters. For instance, slow-varying parameters can be sampled at a lower frequency (higher Tp) and fast-varying parameters can be sampled at a higher rate (lower Tp).

In some embodiments each slave device can be configured such that once a broadcast freeze command is received, the last measured value of the requested parameter is frozen and no further measurement is performed, until the data-gathering time period has lapsed. In preferred embodiments, however, the slave devices can be configured to continue measuring the parameter values.

According to some embodiments, each slave device can be configured for measuring and storing a large amount of parameters. The freeze command can provoke freezing of all measurements performed by the devices, such that upon receipt of a freeze command, all the data are frozen in a storage memory for subsequent collection by the master unit. Freezing all data at the same instant is, however, not mandatory. In some embodiments, a selected sub-set of measured values of time-variable parameters can be frozen for the purpose of subsequent collection or gathering by the master device.

For instance, one or several "freeze class" commands can be provided; each "freeze class" command will instruct the slave devices to freeze only data belonging to a class, group, set or subset of measured time-variable parameters.

The time-variable parameters can thus be classified in groups, classes, sets, or subsets, which can be frozen at the same time, each group independently of the others and separately from the others, upon receipt of the corresponding "freeze-class" command. This permits to classify specific sets of measures that need to be frozen. E.g. an "energy set" can include instant power and aggregate power (active power, reactive power) measurements. A "grid set" can include grid voltage, grid current and grid frequency measurements. If the devices are inverters associated to photovoltaic panels, another possible set or class of parameters can be the "panel set" that can include panel voltage, panel current and panel irradiation. A yet further set of parameters can include temperature of internal components, internal states of the device and the like.

In order to manage different classes, groups or sets of measured parameters to be frozen independently one from the other, the "freeze" command can be comprised of a payload that specifies which set or sets need to be frozen and stored. Clearly the payload can include instructions to freeze all data at the same time. To setup the freeze set, a new "freeze set association" command can be used In embodiments disclosed herein, the method can further include the steps of providing, at each slave device, a first data storage memory area, where at least the last periodically measured value of the at least one time-variable parameter is stored; and further providing a second data storage memory area, where the value of the at least one time-variable parameter is frozen-stored upon receipt of the broadcast freeze command, and wherefrom the frozen value is recovered and transmitted to the master device during the data-gathering time interval.

In some embodiments the master device can gather from the slave devices a single parameter measurement at a time. Once the broadcast freeze command has been transmitted, the last measured data concerning a plurality of time-variable parameters can be frozen at each slave device. The master device can subsequently gather one stored and frozen parameter at a time from each slave device. This makes the transmission protocol particularly simple even though the required time for gathering the entire stored measurements becomes longer. Since the stored values have been frozen, a longer time required for polling the slave devices does not negatively affect the synchronism of the measurements. Gathering multiple measurements simultaneously is not excluded, however. For instance, the master device can gather the full set of measured and frozen data, or a sub-set of said data, from each slave device simultaneously.

A temporary interruption or noise in the transmission channel may cause some slave devices to miss the broadcast freeze command. If this happens, these slave devices which have not received the broadcast freeze command will not freeze the last measured values and will either transmit no data or transmit non-synchronized data during the data gathering phase following freezing of the measured data. To reduce the risk of such event, according to some embodiments the master device can be configured to transmit sequentially, within a short period of time, multiple broadcast freeze commands, such that the chances for each slave device to correctly receive at least one of said broadcast freeze commands is increased.

In some embodiments, the broadcast freeze command can include an identification code, e.g. a random identification code. The slave devices can be configured to store, i.e. to freeze the measured data in response to the receipt of a broadcast freeze command in combination with information related to the identification code associated with the broadcast freeze command. For instance, each measured value can be frozen as a combined string of information, including the identification code associated with the broadcast freeze command and the measured value. During the subsequent data gathering phase, the measured values are transmitted from the slave devices to the master device in association with the identification code, such that the data received by the master slave contain an indication about which broadcast freeze command has triggered freezing of the received data. This will avoid the master device to wrongly consider an "old" frozen value as the correct value frozen upon receipt of the last generated broadcast freeze command.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Herein after an application of the invention to a solar power plant using photovoltaic panels is described as an exemplary embodiment. Those expert in the field will understand that various features and advantages of the invention can be utilized also in different systems, where similar needs arise.

Figure 1:
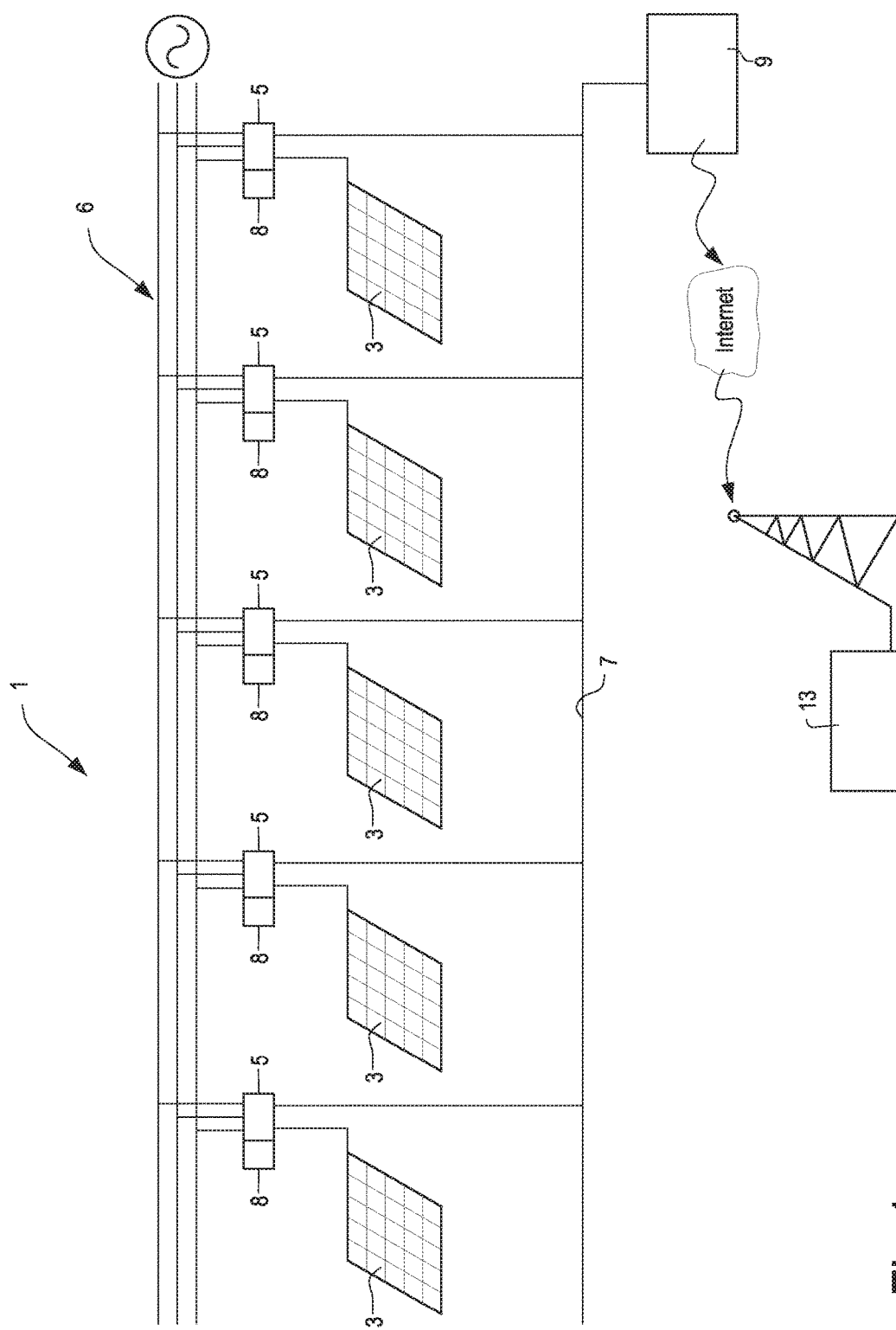
FIG. 1 illustrates a schematic of an exemplary photovoltaic or solar power plant comprising a plurality of inverters, a data transmission channel and a master device.

FIG. 1 schematically illustrates an exemplary embodiment of the subject matter disclosed herein, in a solar plant application. In FIG. 1 reference number 1 designates a solar plant as a whole. The solar plant can include one or more photovoltaic panels or clusters of photovoltaic panels. Each photovoltaic panel, or group, or cluster of photovoltaic panels is labeled 3. In other embodiments, not shown, a different kind of electric renewable power generators can be used, e.g. wind turbines in a wind farm, or power supply or rectifiers used in power stations for telecom or the like. In some embodiments each photovoltaic panel or group of photovoltaic panels can be provided with a power converter, e.g. an inverter 5. The inverters 5 can connect each photovoltaic panel or group of photovoltaic panels to an electric distribution grid 6, or to a user, for instance. DC electric power generated by the photovoltaic panels 3 is converted into AC electric power and delivered to the electric power distribution grid 6 by the inverters 5. Each inverter 5 therefore conditions the power inputted by the DC source to obtain AC power at the correct frequency and phase for injection in the AC electric power distribution grid 6.

Each inverter is advantageously provided with an embedded electronic control unit or other suitable electronic control device 8, to manage the inverter 5 and the photovoltaic panels 3. In the block diagrams of FIGS. 1, 2, 4, the control device 8, e.g. a microcontroller, embedded in the electronic device 5 is illustrated as a separate functional block, but it shall be understood that the electronic control device 8 is usually a part of the inverter 5. In some embodiments, the control device 8 is also in charge of executing a suitable MPPT (Maximum Power Point Tracking) algorithm for maximizing the electric power extracted from the photovoltaic panels.

The control device 8 of each inverter 5 can further be configured for collecting data concerning operating parameters and/or internal status parameters of the photovoltaic panels 3 and of the inverter 5, whereof the control device 8 forms part. For instance, the control device 8 can be configured for sampling and storing data on the input voltage, output voltage, input current, output current of the respective inverter 5, as well as on the frequency and/or phase of the output electric current. Other operative parameters of the inverter-photovoltaic panel system can be monitored by the electronic control devices 8, such as the temperature of the photovoltaic panels and/or of any other electric or electronic component, or the like.

In general terms, the electronic control devices 8 can monitor a plurality of time-variable parameters which may be required for monitoring or statistic purposes, maintenance or other (e.g. report of produced energy).

The electronic control devices 8 can be connected to a data collecting unit 9 operating as a master device and data logger controller, which supervises and manages the electronic control devices 8, the latter operating as respective slave devices. A communication channel or transmission channel 7 can be provided, connecting each slave device 8 to the master device 9. An RS485 serial line or another low-speed, low-cost transmission channel can be utilized for this purpose.

The transmission channel 7 can be wired, or wireless. Even though presently preferred embodiments provide for a physical connection through a cable or bus, radio communication is not excluded.

The master device 9 can in turn be connected to a remote central control facility 13. The connection between the master device 9 and the remote central control facility 13 can be by means of any suitable communication system, e.g. via the Internet.

The master device 9 can be configured to exchange commands with the slave devices 8 and/or gather data from the plurality of slave devices 8. Each slave device 8 can be configured to exchange commands, data or the like with another slave device 8 or the master device 9.

Communications between slave devices 8 and master device 9 can occur by means of messages transmitted through transmission channel 7. Each message can be comprised of a sequence of digital data according to any suitable transmission protocol. A section of the message can for instance characterize the nature of the message; another section can contain an address of the addressee device, for which the message is intended. A payload portion of the message can contain instructions, data, commands, information or the like which are transmitted from the master device 9 to one or more slave devices 8 or vice-versa, or else from one slave device 8 to another slave device 8, if required.

For instance, switching-on and switching-off or (active/reactive) power limitation commands to selective slave devices 8, data gathering requests to selective slave devices 8 or other commands, instructions or requests to individual slave devices 8 can be transmitted by the master device 9 through transmission channel 7. Instructions, commands, messages or requests can also be transmitted by master device 9 to all slave devices 8 in a so-called broadcast mode. As understood herein a broadcast instruction, command, message or request is one that is addressed to all slave devices 8. A broadcast message can for instance include a switching-on or a switching-off instruction, a clock-resetting or synchronizing instruction or any other instruction, information or command that shall be received by all slave devices. A broadcast instruction or command can contain a request to the slave devices to perform a given action.

Figure 2:
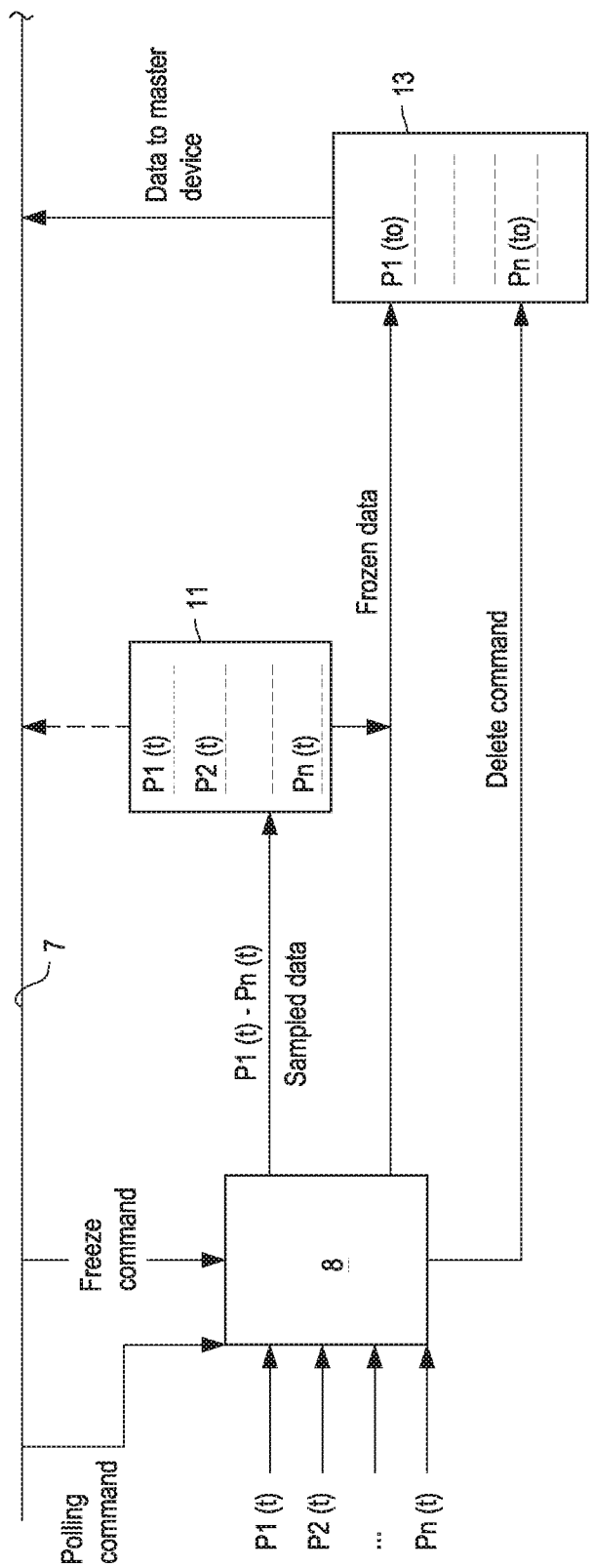
FIG. 2 illustrates a block diagram indicative of a possible embodiment of the method disclosed herein, where freezing the measured data involves copying data, temporarily stored in a current data storage area, in a frozen data storage area.

Each slave device 8 can be configured and controlled to sample and store measured values of a plurality of parameters. In FIG. 2 an exemplary slave device 8 is provided with a plurality of inputs receiving sampled and measured values of a plurality of "n" parameters $P1(t), P2(t), \ldots Pn(t)$. Input data can be received from measuring sensors, transducers or probes, such as temperature probes, voltage or current sensors, and the like. Some or all parameters can be time-variable parameters.

According to some embodiments, as schematically represented in FIG. 2, a slave device 8 can be provided with a first storage memory or storage memory area 11 and a second storage memory or storage memory area 13. Sampled values of the parameters $P1(t) \ldots Pn(t)$ can be temporarily stored in storage memory 11. The second storage memory 13 can be used to support a freeze-command capability of slave device 8, as described in greater detail herein after.

During operation, each slave device 8 can periodically update the sampled values of the measured parameters $P1(t), \ldots Pn(t)$. The sampling and storing frequency can differ from one parameter to the other and can be e.g. determined by the expected variation rate of the measured parameter. Fast-varying parameters may require more frequent sampling, while for slow-varying parameters a lower sampling frequency can be used. Each time a sampled value of any one of the parameters $P1(t), \ldots Pn(t)$ is available, such value can be stored in the first storage memory 11. The latter therefore can contain a set of sampled values of parameters $P1(t), \ldots Pn(t)$ containing the latest sampled value for each parameter.

The data stored in the first storage memory 11 can be used by slave device 8 for its own operation or for controlling the operation of inverter 5, for instance.

According to some embodiments disclosed herein, values of at least some of the time-variable parameters $P1(t), \ldots Pn(t)$ sampled and stored by each slave device 8 can be gathered at given time intervals by the master device 9. As mentioned in the background art section above, a data polling process controlled by the master slave 9 to gather data from individual slave devices 8 may require a time interval which is very long if compared to the variation rate of the measured time-variable parameters. For instance, power generated by each individual inverter 5 can fluctuate at a rate which is faster than the time required to collect instant-power measurement data by sequentially gathering data from all slave devices 8.

To provide time-consistent data gathering, the master device 9 and slave devices 8 can be configured and controlled to operate according to the procedure described herein after, reference being made to FIGS. 2 and 3.

The master device 9 and at least some of the slave devices 8 can be configured to support a freeze-command feature. A freeze command as understood herein is a broadcast command, i.e. a command generated by the master device 9 and addressed to a plurality of slave devices 8. The freeze command requires each addressee slave device 8 to freeze one or more sampled and measured values of the parameters P1(*t*), . . . Pn(t) and maintain the frozen value(s) unvaried for a period of time. In the exemplary embodiment disclosed herein, it will be assumed that each freeze command requires to freeze all the sampled and measured values of parameters P1(*t*), . . . Pn(t). This, however, is not essential, since according to some embodiments different freeze commands can be provided, each requesting freezing of a different set of measured values of parameters P1(*t*), . . . Pn(t). Moreover, it will be assumed that a broadcast freeze command will initiate a data-freezing routine at each slave device 8, which supports the freeze command. This, however, is again not strictly necessary. In alternative embodiments, for instance, selective broadcast commands can be provided, each addressed to a selected sub-group of slave devices 8. In that case only the selected slave devices 8 will initiate the freeze routine as described below.

When selective freezing of different parameter subsets, groups or classes is desirable, according to some embodiments the broadcast message can include a payload that can be referred to certain subsets of logical parameters that need to be aggregated and frozen.

In detail, a "freeze class" command can be used, which can classify sets of parameters that need to be frozen together. This permits to classify specific sets of measurements that need to be frozen at the same time. E.g. an "energy set" could include instant power and aggregate energy (active, reactive) measurements; a "grid set" can include grid voltage, grid current and grid frequency measurements; a "panel set" can include panel voltage, panel current and panel irradiation; an "internal set" can include temperature of internal components, internal states and the like. The "freeze" command can include a payload that specifies which set(s) of parameters need to be frozen and stored. The freeze command can cause the slave devices to freeze the measured parameters of one, some or all sets, subsets, groups or classes. In simpler embodiments the freeze command can include a payload which allows freezing of only one class of parameters at a time.

To setup the freeze sets, a "freeze set association" command can be used, which allows the user to define sets of parameters according to needs.

In other embodiments, no freeze class command is provided, and each freeze command provokes freezing of all available measurements of time-variable parameters According to some embodiments, if at a given instant in time (t0) the master device 9 requires to gather stored data from the slave devices 8, a broadcast freeze command is transmitted from master device 9 to slave devices 8. Upon receipt of a freeze command from transmission channel 7, each slave device 8 generates a copy of the measured values of parameters P1(*t*), . . . Pn(t) from the first storage memory 11 to the second storage memory 13. These frozen values are labeled P1(*t*0), . . . Pn(t0) in FIGS. 2 and 3. The slave device 8 can be configured to maintain the frozen parameters P1(*t*0), . . . Pn(t0) unvaried for a given maximum gathering time interval ΔTG. The maximum gathering time interval can be set at such as to allow sufficient time to the master device 9 for polling each slave device 8 and gather the frozen data therefrom.

Figure 3:
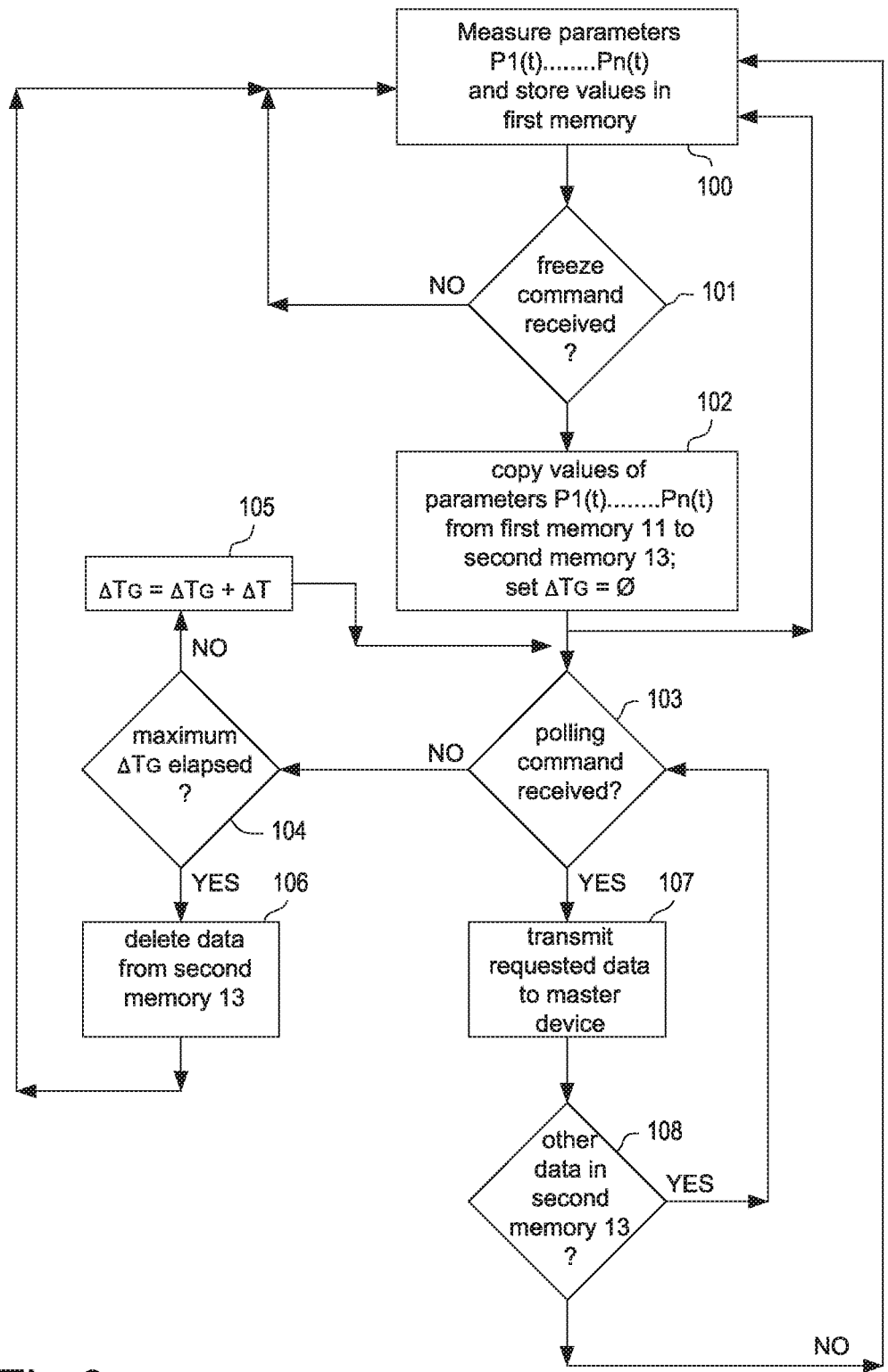
FIG. 3 illustrates a flow chart of an embodiment of the method disclosed herein.

Referring now to the flow chart in FIG. 3, as far as no freeze command is received, each slave device 8 continues sampling and storing updated values of the measured parameters P1(*t*), . . . Pn(t) in the first storage memory 11, as schematically represented by blocks 100 and 101 in the flow-chart of FIG. 3. Once the freeze command is received at time t0 by a slave device 8, this latter copies the latest updated values of parameters P1(*t*), . . . Pn(t) from the first storage memory 11 to the second storage memory 13, see block 102 in FIG. 3, generating a set of frozen data P1(*t*0), . . . Pn(t0).

The frozen data are maintained unchanged in the second storage memory 13 for a period of time. According to some embodiments, the data P1(*t*0), . . . Pn(t0) can remain stored in second storage memory 13 until a new freeze command is received at instant t1, whereupon the set of data P1(*t*0), . . . Pn(t0) can be replaced by an updated set of data P1(*t*1), . . . Pn(t1). In the exemplary embodiment of FIG. 3, however, the frozen data P1(*t*0), . . . Pn(t0) are maintained for a maximum storage time ΔTG, whereafter the data are deleted from second storage memory 13, see blocks 104, 105 and 106 in FIG. 3. In this case the data provided to the master device will be again the latest ones available (the parameter value updated continuously on the storage memory 11).

Once the freeze command has been executed, the master device 9 will start a polling and data gathering routine, during which the frozen data from the various slave devices 8 are gathered. Polling can be performed e.g. by requesting each slave device 8 (or a selected sub-group of said slave devices 8) to transmit via transmission channel 7 one or some selected sampled and frozen data at a time. In other embodiments, the whole set of frozen data can be transmitted simultaneously by the polled slave device 8 to the master device 9. The number of simultaneously transmitted measured and frozen values of parameters P1(*t*0), . . . Pn(t0) can depend e.g. upon the transmission protocol used. If the transmission protocol provides for messages with a small payload capability, a single measured and frozen parameter value can be transmitted at a time. If this is the case, the master device 9 can sequentially poll the whole set of slave devices 8, gathering the value of the same parameter (say for instance Pi(t0)) from all slave devices 8. The routine is then repeated to gather the values of the next parameter Pi+1(t0) and so on, until the last measured and frozen value Pn(t0) is gathered from the last slave device 8.

According to other embodiments, polling can be executed by sequentially gathering all the frozen data from P1(*t*0) to Pn(t0) of the first slave device 8, and then move to the next slave device 8, until the last slave device 8 is polled.

If the transmission protocol supports transmission of more than one sampled and frozen value at a time, the data gathering routine can be executed by gathering several measured and frozen values with each single message.

In FIGS. 2 and 3, reference is made to a generic "polling command", which the master device 9 can address to a selected slave device 8 to initiate gathering of one or more stored and frozen values P1(*t*0), . . . Pn(t0).

In the flow chart of FIG. 3, blocks 103 and 107 generically represent transmission of (one or more) measured and frozen values from the slave device 8 to the master device 9. The slave device 108 can be configured to check if all frozen data have been gathered by the master device 9 (block 108), and to end the data gathering process by returning to block 100.

During the whole polling and data gathering routine (blocks 102 to 108 in FIG. 3), the slave device 8 can continue monitoring the parameters P1(*t*), . . . Pn(t) such as to sample and store updated values of parameters P1(*t*), . . . Pn(t) in the first storage memory 11. The latter, therefore, always contains the most recent sampled and measured value. The values stored in the first storage memory 11 can be used by the slave device 8 for its own purposes, e.g. for controlling the inverter 5 associated therewith. The most recent value of a given parameter Pi(t) stored in the first storage memory 11 can also be transmitted from slave device 8 to the master device 9, if so required e.g. by a specific command sent by master device 9 to slave device 8.

By continuing to store the most recently sampled and measured values of parameters P1(*t*), . . . Pn(t) in the first storage memory 11 also during the data gathering routine following receipt of a frozen command, each slave device 8 is capable of immediately responding to a subsequent freeze command from the master device 9. The content of the first storage memory 11 represents always the most updated set of measured data and can be immediately copied in the second storage memory 13 upon receipt of the next freeze command, irrespective of the sampling frequency used by the slave device 8 to sample and store the measured parameter values.

The maximum gathering time interval ΔTG, after which the frozen data are deleted ensures that the second storage memory is cleared even if the polling command(s) is(are) not received by the slave device 8, e.g. because the master device 9 does not gather data from that specific slave device 8, or for instance if the polling command is not received for whatever reason, e.g. due to temporary interruption of the transmission channel 7.

The result of the above described data gathering procedure is the following: the master device 9 collects data which are the most recent data at a same instant in time t0, even if the entire polling and data gathering process lasts much longer than the longest data sampling period of slave devices 8. The collected data are always the most recent ones, which were available in the storage memories 11 of slave devices 8 at the freeze time instant t0. Time coherent and synchronized data are thus collected.

Figure 4:
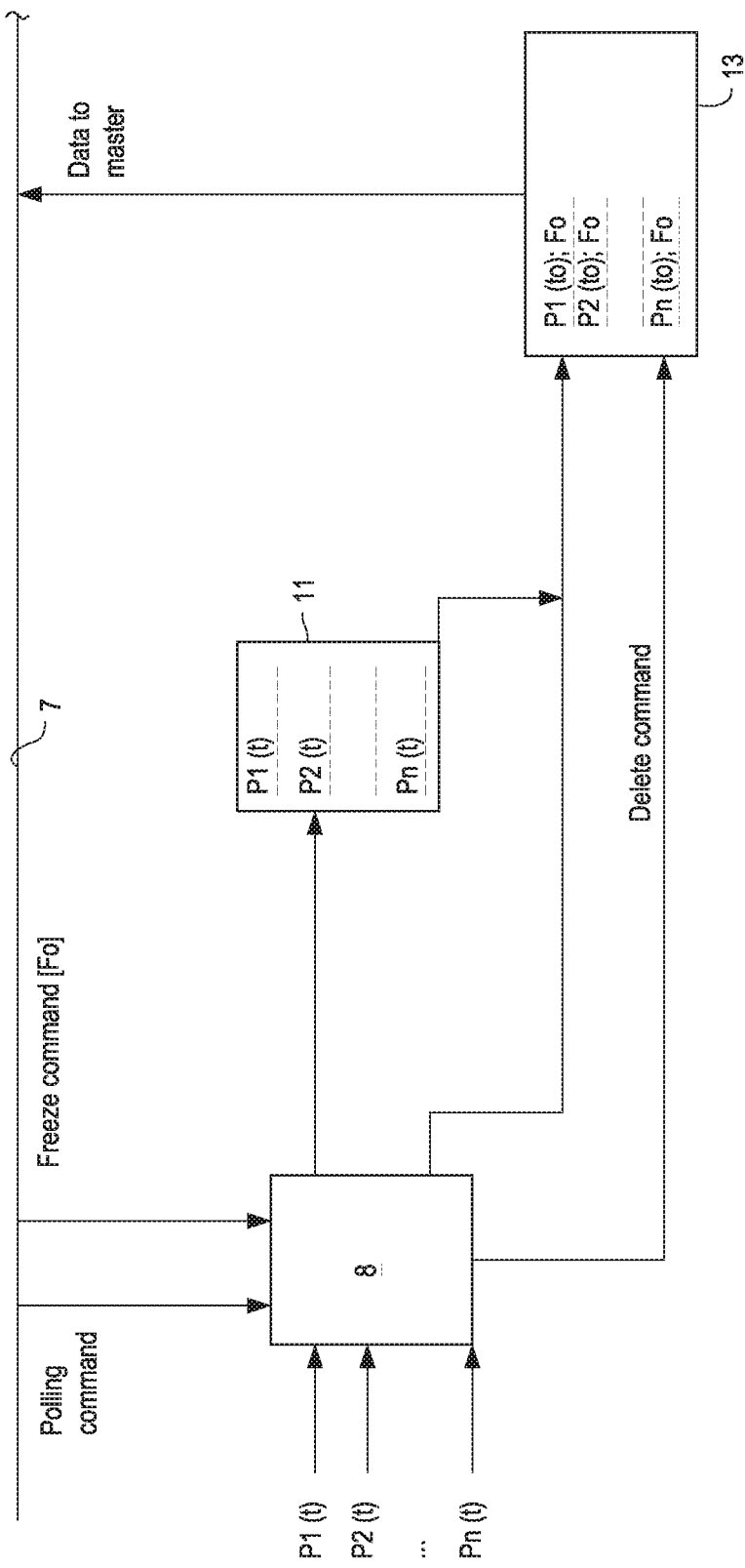
FIG. 4 illustrates a modified embodiment of the slave device of FIG. 2.

According to a modified embodiment, the master device 9 can label the freeze command with an identification code, which can be a random number, a serial number or the like. The identification code can be combined with the measurement data P1(*t*), . . . Pn(t) that shall be frozen, such that in the second storage memory 13 a set of frozen data is stored, wherein each measured and frozen value is associated with the identification code or a code related thereto. FIG. 4 illustrates a block diagram of a slave device 8 and relevant first and second storage memories 11, 13 according to such modified embodiment. The identification code which characterizes a freeze command is indicated as F0 and the data stored in the second storage memory 13 are indicated as P1(*t*0); F0, . . . Pn(t0); F0, which indicates that each frozen-stored value is associated with a respective identification code F0. When the data P1(*t*0); F0, . . . Pn(t0); F0 are gathered, the master device 9 is able to immediately check if the gathered data is in response of the actual freeze command (identified by identification code F0). If for some reason the second storage memory 13 still contains old data, e.g. stored in response to a previous freeze command, the master device 9 will detect the failure as the identification code associated with the gathered data does not match the identification code of the last freeze command.

According to other embodiments, each slave device 8 can store an identification code F0 associated with a given frozen action, i.e. with the broadcasting of a freeze command. Upon receipt of a freeze command identified by the identification code F0, each slave device 8 will have the identification code F0 stored in a memory slot. During data polling, i.e. during the data gathering routine from each slave device 8, the master device 9 can firstly require the slave device 8 to transmit the identification code which is stored in the memory thereof. Only if the stored identification code corresponds to the last freeze command broadcasted by the master device 9, will the data stored by the slave device 8 be collected by the master device 9.

Otherwise, if the identification code stored in the memory of the slave device 8 does not correspond to the identification code of the last freeze command sent by the master device, the master slave 9 will understand that the polled slave device 8 has not received the last freeze command and therefore the data stored in the second storage memory 13 are not updated and will discard the data. In this manner, when the master device 9 polls data from a slave device 8, it can figure out if the slave device 8 is correctly aligned with the freeze process and only if the slave device 8 is aligned (it has the expected identification code F0 stored) the master device 9 proceeds with the polling of the stored frozen parameters.

Use of an identification code, according to any one of the above described ways, enables the master device 9 to recognize if a given slave device 8 has received the latest freeze command. It is thus possible for the master device 9 to gather data only from those slave devices 8 which have actually received the current freeze command, and which have thus transferred in the second storage memory 13 the most updated values of the measured time-variable data.

Use of a freeze command identification code F0 can also be used to store a plurality of frozen data, upon receipt of a plurality of sequentially sent freeze commands, while the data gathering routine is launched only later on. For instance, the master device may send a first broadcast freeze command identified by identification code F1 and, after a given time interval, a second broadcast freeze command identified by identification code F2. Each slave device 8 can be provided with sufficient storage memory to store a first set of frozen data, in response to the first freeze command received, and a second set of frozen data, in response to the second freeze command received. By storing the first set of frozen data in combination with identification code F1 and the second set of frozen data in combination with identification code F2, the master device 9 will be able to correctly gather the frozen data in a subsequent data gathering routine, whereby the frozen data stored in response to freeze command F1 and the frozen data stored in response to freeze command F2 are gathered separately.

Each one of the two (or more) sets of frozen data stored in this way can include the same or different groups, classes or subsets of measurements. For instance, the first freeze command F1 can require freezing of the "energy set" while the second freeze message F2 can require freezing of the "panel set" of data. Conversely, each freeze command can require freezing of the same measured data, at different time intervals.

By freezing two or more sets of data before the data gathering routine is launched, allows the master device to collect data which are frozen at instants in time which are separated by a time span shorter than the time interval required to perform a full data gathering routine.

Figure 5:
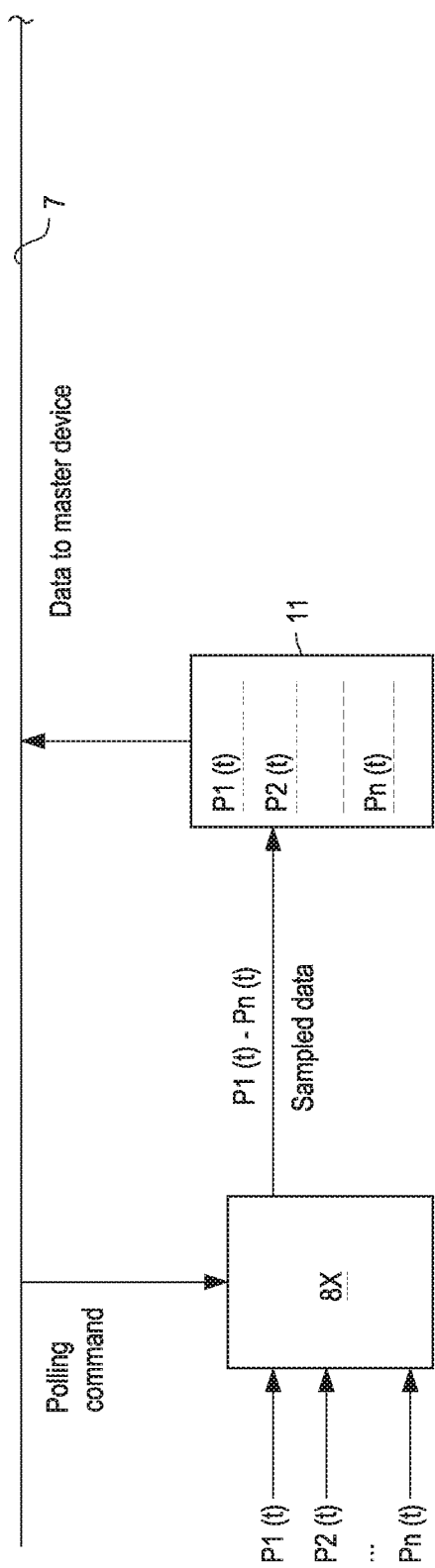
FIG. 5 illustrates a block diagram of a slave unit not supporting data freezing commands.

The above described process can be carried out also in a system where only some of the slave devices 8 support the freeze command. If the system 1 includes one or more slave devices 8, which do not support the freeze command, as for instance a slave device 8X as shown in FIG. 5, the system can still operate correctly. The slave device 8X can be provided with only the first storage memory 11. In such situation, slave device will simply ignore a freeze command. Upon receipt of a polling command from the master device 9, requesting transmission of one or more of the frozen data P1(*t*0), . . . Pn(t0), the slave device 8 will simply send the latest available data from first storage memory 11.

Upgrading of an existing system with the new freeze-command option is thus possible, even if one or some of the slave devices 8 are not suitable to support the freeze function.

In the above described exemplary embodiment, a system 1 including identical or similar slave devices 8 has been described. It shall however be understood that the features of the subject matter disclosed herein can be embodied also in systems including different electronic devices. These latter can be grouped in sub-sets, for instance, and the master device 9 can be configured to gather data from each sub-set at a time using dedicated freeze and polling commands.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

Thus, although there have been described particular embodiments of the present invention of a new and useful SYSTEM AND METHOD FOR COHERENT AGGREGATION AND SNCHRONIZATION OF GATEHRED DATA FROM SPREAD DEVICES it is not intended that such references be construed as limitations upon the scope of this invention except as set forth in the following claims.

What is claimed is:

1. A method for gathering time-variable data from electronic slave devices in data communication through a data transmission channel with an electronic master device, the method comprising the following steps:
   the slave devices periodically measuring and storing a current value of at least one respective time-variable parameter;
   the master device sending a freeze command as a broadcast to each of the slave devices, wherein the freeze command containing a freeze-command identification code;
   upon receipt of the freeze command from the master device, the slave devices freezing the last measured value of the at least one time-variable parameter; and
   during a data-gathering time interval following sending of the freeze command, the master device gathering the frozen values from each of the slave devices.

2. The method of claim 1, further comprising:
   providing, at each slave device, a first data storage memory area, where at least the last periodically measured value of the at least one time-variable parameter is stored;
   providing a second data storage memory area, where the value of the at least one time-variable parameter is frozen-stored upon receipt of the freeze command, and wherefrom the frozen value is recovered and transmitted to the master device during the data-gathering time interval.

3. The method of claim 1, wherein upon sending of a current freeze command, before gathering frozen data from each one of said slave devices, the master device checks if the slave device has received the current freeze command, and wherein only those frozen values are gathered which have been frozen in response to the current freeze command.

4. The method of claim 1,
   the master device gathers data from only those master slave devices which have received the freeze-command identification code.

5. The method of claim 1,
   the slave devices freeze the last measured value of the at least one time-variable parameter in combination with the identification code or a code related thereto; and
   the frozen data gathered by the master device contain said identification code or a code related thereto.

6. The method of claim 4, wherein the identification code comprises a random identification code.

7. The method of claim 1, wherein the frozen value is deleted upon expiration of a maximum data-gathering time interval.

8. The method of claim 1, further comprising:
   grouping a plurality of time-variable parameters into classes, groups, sets or subsets; and
   selectively freezing the last measured values of only one or some of the groups, sets or subsets of time-variable parameters.

9. The method of claim 8, wherein the freeze command contains a payload identifying the group(s), set(s), class(s) or subset(s), the values whereof shall be frozen and subsequently gathered by the master device.

10. The method of claim 1, wherein the slave devices are power converting devices connected to electric generators, preferably electric generators converting a power from a renewable energy source into electric power.

11. The method of claim 1, wherein the slave device includes a renewable energy source comprising an inverter; and wherein the at least one time-variable parameter is an operating parameter of the renewable energy source.

12. The method of 11, wherein the time-variable parameter is selected from the group consisting of: an input voltage of the inverter; an output voltage of the inverter; an input current of the inverter; an output current of the inverter; a phase of the output current of the inverter; a frequency of the output current of the inverter; an output power of the inverter; and a temperature of a component of the renewable energy source.

13. The method of claim 1, wherein the slave device includes a renewable energy source comprising an inverter; and wherein the at least one time-variable parameter is an operating parameter of the renewable energy source.

14. The method of claim 13, wherein the time-variable parameter is selected from the group consisting of: an input voltage of the inverter; an output voltage of the inverter; an input current of the inverter; an output current of the inverter; a phase of the output current of the inverter; a frequency of the output current of the inverter; and an output power of the inverter; a temperature of a component of the renewable energy source.

15. A system comprising:
   a plurality of electronic slave devices;
   an electronic master device; and
   a data transmission channel connecting the slave devices to the master device, wherein the master device is configured and arranged for sending a freeze command as a broadcast to each of the slave devices, wherein the freeze command containing a freeze-command identification code and for gathering time-variable data from each of the slave devices during a data-gathering time interval following the freeze command, and each slave device is configured and arranged for periodically measuring and storing a value of at least one respective time-variable parameter, freezing the last measured value of said time-variable parameter upon receipt of a freeze command from the master device, and transmitting the frozen value of the at least one time-variable parameter to the master device during the data-gathering time interval.

16. The system of claim 15, wherein each slave device comprises:
 a first data storage memory area, the slave device being configured for storing in the first data storage memory area at least the last periodically measured value of the at least one time-variable parameter; and
 and a second data storage memory area, the slave device being configured for frozen-storing the last periodically measured value of the at least one time-variable parameter upon receipt of the freeze command and for recovering the frozen value of the at least one time-variable parameter from the second data storage memory area and sending said frozen value to the master device during the data-gathering time interval.

17. The system of claim 15, wherein the slave devices are configured for deleting the frozen data of the at least one measured parameter upon expiration of a maximum data-gathering time interval.

18. The system of claim 15, wherein the master device is configured for combining an identification code to the freeze command, and wherein the slave devices are configured for freezing the value of said at least one parameter in combination with the identification code or a code related thereto.

19. The system of claim 18, wherein the slave devices are configured for transmitting the at least one frozen value to the master device in combination with said identification code or said code related thereto.

20. The system of claim 18, wherein the master device is configured for checking if the identification code, or a code related thereto, which has been combined by each slave device to the frozen value of said at least one parameter corresponds to the latest sent freeze command.

21. The system of claim 15, wherein the master device is configured for sending a freeze command containing a payload which selects one or more classes, sets, subsets or groups of a plurality of time-variable parameters, such that only the slave devices selectively freeze only the values of the time-variable parameters belonging to the group(s), set(s), subset(s) or class(es) identified by the payload.

22. The system of claim 15, wherein the slave devices comprise power converting devices connected to electric generators.

* * * * *